United States Patent
Wilging

(10) Patent No.: US 12,438,414 B2
(45) Date of Patent: Oct. 7, 2025

(54) DRIVE INCLUDING AN ELECTRIC MOTOR WITH A BRAKE ASSEMBLY

(71) Applicant: SEW-EURODRIVE GMBH & CO. KG, Bruchsal (DE)

(72) Inventor: Klaus Wilging, Stutensee (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 380 days.

(21) Appl. No.: 17/928,731

(22) PCT Filed: May 19, 2021

(86) PCT No.: PCT/EP2021/025185
§ 371 (c)(1),
(2) Date: Nov. 30, 2022

(87) PCT Pub. No.: WO2021/244773
PCT Pub. Date: Dec. 9, 2021

(65) Prior Publication Data
US 2023/0299636 A1    Sep. 21, 2023

(30) Foreign Application Priority Data
Jun. 4, 2020   (DE) .......................... 102020003372.5

(51) Int. Cl.
*H02K 7/10*    (2006.01)
*F16D 55/02*   (2006.01)
(Continued)

(52) U.S. Cl.
CPC ........... *H02K 7/1025* (2013.01); *F16D 55/02* (2013.01); *F16D 65/186* (2013.01); *H02K 7/083* (2013.01);
(Continued)

(58) Field of Classification Search
CPC ...... H02K 7/1025; H02K 11/21; H02K 7/083; H02K 7/116; F16D 55/02; F16D 65/186; F16D 2121/14; F16D 2121/22
See application file for complete search history.

(56) References Cited

U.S. PATENT DOCUMENTS

| | | |
|---|---|---|
| 4,560,895 A | 12/1985 | Zahner |
| 9,157,507 B2 | 10/2015 | Zimmermann et al. |
| 2004/0130224 A1 | 7/2004 | Mogi et al. |

FOREIGN PATENT DOCUMENTS

| | | |
|---|---|---|
| DE | 2257290 A1 | 6/1974 |
| DE | 102008037737 A1 | 3/2009 |

(Continued)

OTHER PUBLICATIONS

International Report on Patentability issued in corresponding International Application No. PCT/EP2021/025185 dated Dec. 6, 2022, pp. 1-8, English Translation.

(Continued)

*Primary Examiner* — Terrance L Kenerly
(74) *Attorney, Agent, or Firm* — Carter, DeLuca & Farrell LLP

(57) ABSTRACT

A drive includes an electric motor with a brake assembly. The electric motor has a rotor rotatably mounted via a first bearing and a second bearing and has a housing part. The first bearing has an inner ring and an outer ring, and the inner ring is received on the rotor, e.g., placed thereover, e.g., is positioned against a step or pressed against a catch that is positioned against a step formed on the rotor. The brake assembly has a magnetic body, e.g., made of a ferromagnetic material. The outer ring is received in the magnetic body of the brake assembly, e.g., is positioned against a step.

21 Claims, 4 Drawing Sheets

(51) Int. Cl.
| | |
|---|---|
| *F16D 65/18* | (2006.01) |
| *H02K 7/08* | (2006.01) |
| *H02K 7/102* | (2006.01) |
| *H02K 7/116* | (2006.01) |
| *H02K 11/21* | (2016.01) |
| *F16D 121/14* | (2012.01) |
| *F16D 121/22* | (2012.01) |

(52) U.S. Cl.
CPC ............ *H02K 7/116* (2013.01); *H02K 11/21* (2016.01); *F16D 2121/14* (2013.01); *F16D 2121/22* (2013.01)

(56) References Cited

FOREIGN PATENT DOCUMENTS

| | | |
|---|---|---|
| DE | 102012010790 A1 | 12/2013 |
| DE | 102012019415 A1 | 4/2014 |
| DE | 102013005239 A1 | 5/2014 |
| DE | 202016107420 U1 | 1/2017 |
| EP | 0111350 A1 | 6/1984 |
| EP | 1011188 A1 | 6/2000 |
| WO | 2004077644 A2 | 9/2004 |

OTHER PUBLICATIONS

International Search Report issued in corresponding International Application No. PCT/EP2021/025185 dated Sep. 1, 2021, pp. 1-2, English Translation.

DRIVE INCLUDING AN ELECTRIC MOTOR WITH A BRAKE ASSEMBLY

FIELD OF THE INVENTION

The present invention relates to a drive that includes an electric motor with a brake assembly.

BACKGROUND INFORMATION

In certain conventional systems, a drive includes an electric motor.

An electromagnetic brake is described in German Patent Document No. 22 57 290.

An electric motor having a redundant brake is described in German Patent Document No. 10 2012 019 415.

A brake is described in German Patent Document No. 10 2012 010 790.

A brake assembly is described in German Patent Document No. 10 2013 005 239.

Gear motors are described in PCT Patent Document No. WO 2004/077644.

An electric motor having an angle sensor is described in German Patent Document No. 10 2008 037 737.

A device for producing braking force transmissions is described in German Patent Document No. 20 2016 107 420.

SUMMARY

Example embodiments of the present invention provide for precise drive control.

According to an example embodiment of the present invention, a drive includes an electric motor with a brake assembly. The electric motor has a rotor rotatably mounted via a first bearing and a second bearing and has a housing part. The first bearing has an inner ring and an outer ring, and the inner ring of the first bearing is received on the rotor, e.g., placed thereover, positioned against a step or pressed against a catch that is positioned against a step formed on the rotor, etc. The brake assembly has a magnetic body, e.g., made of a ferromagnetic material. The outer ring of the first bearing is received in the magnetic body of the brake assembly, e.g., is positioned against a step.

Thus, precise control of the drive is achieved. This is because, due to the two fixed bearings of the rotor, highly accurate robust angle detection on the rotor of the electric motor of the drive embodied as a gear motor is provided, and the detected angle value is as precisely proportional as possible to the angle value of the output shaft.

By using a fixed bearing in the region of the angle sensor, it is possible to determine the angle very precisely, even with thermally-caused expansions in the drive, because the distance between the first bearing arranged as a fixed bearing and the angle sensor is much smaller than the distance between the first bearing and the second bearing.

Since the second bearing, that is, the gearbox-side bearing, of the rotor is also a fixed bearing, the helically toothed sun gear inserted into the rotor shaft remains substantially at its axial position, even given thermal expansions. The distance between the first and second bearings changes, e.g., in relation to the housing part, due to thermally caused changes in length, but the sun gear is not twisted, despite its helical teeth, and the angle sensor also works undisturbed.

The first bearing is received in the magnetic body of the brake assembly. Therefore, the change in distance between the first and second bearings is not compensated by displacement of the first bearing in the magnetic body, but instead by displacement of the magnetic body relative to the receiving part, that is, also relative to the housing part.

In this manner, bilateral axial fixed bearing is provided with angle determination that is robust against thermal influences.

The rotor is, for example, made of steel, and the housing part is, for example, made of aluminum. That is, when rotor and housing part are made of different materials, an angle error can be prevented or at least reduced according to the measures described herein.

According to example embodiments, the second bearing, e.g., the outer ring of the second bearing, is received in the housing or in a flange part connected to the housing part, e.g., is positioned against a step. Thus, that thermally-caused changes in length of the housing and/or rotor, e.g., of the housing relative to the rotor, do not cause any twisting in the shafts of the gearbox, even if they are connected rotation-fast to toothed parts that are engaged with one another and have helical teeth.

According to example embodiments, the inner ring of the second bearing is received on, e.g., placed over, the rotor, e.g., is positioned against a step. Thus, the second bearing is arranged as a fixed bearing and thus is proportional to the angle value of the output shaft of the gearbox detected on the rotor. This applies, for example, even when the toothed part connected rotation-fast to the rotor, e.g., a sun gear, is provided with helical teeth.

According to example embodiments, the magnetic body is received in a receiving part connected securely to the housing part or is received in the housing part, the magnetic body is arranged displaceable axially, e.g., parallel to the direction of the rotational axis of the rotor, and is connected to a first torque support part, e.g., by second screws, e.g., second screws spaced apart from one another regularly in the circumferential direction, and the first torque support part is connected to the receiving part and/or to the housing part, e.g., by first screws, e.g., first screws spaced apart from one another regularly in the circumferential direction. Thus, the magnetic body is displaced relative to the receiving part and/or the housing part of the electric motor when there are thermally-caused changes in length.

According to example embodiments, the first torque support part is arranged as a bellows, e.g., a metal bellows, and the region of the first torque support part contacting the receiving part is spaced apart axially from the region contacting the magnetic body, e.g., the region that is arranged at a smaller radial distance than the region contacting the receiving part. Thus, the bearing tension is produced by the same part that is also arranged as the torque support for the magnetic body. This is because the magnetic body is received not only axially displaceable in the receiving part, but also rotatable in the circumferential direction.

According to example embodiments, the first torque support part, e.g., a metal sheet, is arranged as a sheet part such that the region of the first torque support part contacting the receiving part is arranged at the same axial position as the region of the torque support part contacted by the magnetic body, e.g., that is arranged at a smaller radial distance than the region contacting the receiving part. Thus, the torque support part can be optimized for the task of torque transmission, and the spring elements can be optimized for the task of producing the bearing tension.

According to example embodiments, an armature disk, with the catch, is arranged rotation-fast but axially displaceable. For example, a spring element arranged between the catch and the armature disk, e.g., a spring plate connected to the catch by first connecting elements and connected to the armature disk by second connecting elements, generates a spring force oriented towards the catch and acting on the armature disk. For example, the spring element is supported on the catch, and the connecting elements are arranged as rivets. Thus, the armature disk can be readily connected to the catch via a spring plate and connecting elements.

According to example embodiments, a coil is received in the magnetic body, e.g., in the radial direction between the inner ring of the magnetic body and the outer ring of the magnetic body. Thus, depending on the energization of the coil, an opposing field to the magnetic field generated by the permanent magnet can be generated, so that when the coil is energized a lower magnetic flux flows through the armature disk than when the coil is not energized. Thus, when the coil is not energized, the armature disk is pulled towards the magnetic body against the spring force generated by the spring plate, and, when the coil is energized, the armature disk is pulled away from the magnetic body by the spring force.

According to example embodiments, the magnetic body has an outer ring and an inner ring, and a permanent magnet is arranged between the inner ring and the outer ring, e.g., a permanent magnet is arranged in the axial direction between the inner ring and the outer ring. Thus, the magnetic flux of the permanent magnet exiting from the north pole flows through the inner ring of the magnetic body and from there directly or via an air gap to the armature disk and from there directly or via an air gap to the outer ring of the magnetic body and from there to the south pole of the permanent magnet.

Alternatively, the north pole and south pole are permuted. A spacer ring bridges the permanent magnet, so that the spacer ring arranged between the inner ring of the magnetic body and the outer ring of the magnetic body prevents the inner ring of the magnetic body from approaching the outer ring of the magnetic body. The spacer ring is, for example, arranged radially outside of the permanent magnet and/or is formed from a diamagnetic material, e.g., plastic.

According to example embodiments, the outer ring of the first bearing is positioned against a step formed on the magnetic body, e.g., on the inner ring of the magnetic body, and the inner ring of the first bearing is positioned against a step formed on the shaft. Thus, the first bearing is arranged as a fixed bearing, but the magnetic body is axially displaceable relative to the housing part, relative to which the second bearing is arranged non-displaceable, since it is also arranged as a fixed bearing.

The rotor is, for example, rotatably mounted only via the first and second bearings.

According to example embodiments, when the coil is energized, the magnetic flux penetrating the armature disk is reduced, e.g., in comparison to when the coil is not energized. Thus, the braking effect is controllable.

According to example embodiments, the outer ring of the magnetic body is arranged displaceable axially in the receiving part. Thus, different thermally-caused changes in length of the housing part and rotor have only an insignificant influence on the angle detection of the angle sensor, which is arranged closer to the first bearing than to the second bearing.

According to example embodiments, the rotor shaft of an angle sensor is connected rotatably fixed to the rotor, the housing of the angle sensor is connected to a first region of the second torque support part, and a second region of the second torque support part is connected to the inner ring of the magnetic body, e.g., together with an auxiliary sheet is pressed against the inner ring of the magnetic body by a screw. For example, the second region is arranged at a greater radial distance than the first region, and the second region is arranged radially further outward than the first region. Thus, it is possible to carry out temperature-independent angle detection, since the angle sensor is carried along, when the rotor length changes relative to the housing part and thus the first bearing is displaced axially.

According to example embodiments, the radial distance region covered by the first torque support part is spaced apart from the radial distance region covered by the second torque support part and/or the radial distance region covered by the first torque support part is arranged radially outside of the radial distance region covered by the second torque support part. Thus, the first torque support part acts independently of the second torque support part, and a greater torque can be transmitted with a compact configuration.

According to example embodiments, the first torque support part has an inner ring region, an outer ring region, and crosspieces that connect the inner ring region to the outer ring region and that, e.g., are spaced apart from one another regularly in the circumferential direction. The inner ring region is positioned against the inner ring of the magnetic body and the outer ring region is positioned against the receiving part or housing part. Either (a) the greatest circumferential angle value of the circumferential angle region covered by a specific crosspiece at a radial distance increases monotonically, e.g., highly monotonically, that is, e.g., grows circumferentially, as radial distance increases, and the smallest circumferential angle value of this circumferential angle region increases monotonically, e.g., highly monotonically, that is, e.g., grows circumferentially, as radial distance increases, or (b) the greatest circumferential angle value of the circumferential angle region covered by a specific crosspiece at a radial distance decreases monotonically, e.g., highly monotonically, as the radial distance increases, and the smallest circumferential angle value of this circumferential angle region decreases monotonically, e.g., highly monotonically, as the radial distance increases.

Thus, the torque support is arranged particularly effective and/or rigid in one preferred rotational direction, that is, when the rotor is operated in only a single rotational direction, during braking the braking torque can be efficiently derived via the torque support, e.g., in one rotational direction.

According to example embodiments, the bellows supported on the receiving part presses the inner ring of the magnetic body, e.g., the step formed on the inner ring of the magnetic body, towards the outer ring of the first bearing such that the inner ring of the first bearing presses the catch against the step formed on the rotor. Thus, the bellows effects the torque support function, that is, transmission of the reaction torque, and generation of the bearing tension.

According to example embodiments, a spring element supported on the receiving part, the housing part, or a ring securely connected to the receiving part or housing part, presses the inner ring of the magnetic body, e.g., the step formed on the inner ring of the magnetic body, towards the outer ring of the first bearing such that the inner ring of the first bearing presses the catch against the step formed on the rotor. Thus, the spring element can be configured for generating the bearing tension and the torque support part can be configured for the reaction torque transmission.

According to example embodiments, the outer ring of the second bearing has, for example, when flange part and gearbox have not yet been connected to the housing part, in an insulating part, e.g., in an insulating part produced from fiberglass-reinforced plastic, is received. The insulating part is received in the housing part, e.g., is received in a circumferentially-extending annular groove of the housing part, and the flange part is arranged on the side of the insulating part facing away from the first bearing. Thus, it is possible to carry out a functional test of the electric motor prior to the mounting of the gearbox with the flange part. To this end, the outer ring of the second bearing is received in the insulating part.

According to example embodiments, a first subregion of the region covered axially by the outer ring of the second bearing in the axial direction contacts the flange part, and a second subregion of the region covered axially by the outer ring of the second bearing contacts the insulating part. The first subregion is spaced apart from the second subregion or is adjacent thereto, but, for example, the first subregion does not overlap with the second subregion. Thus, it is possible to carry out a functional test prior to mounting the flange part, and the second bearing is arranged as a fixed bearing after the flange part has been mounted. When the flange part is mounted, the second bearing is displaced axially against the spring force produced by the spring element.

Further features and aspects of example embodiments of the present invention are explained in greater detail below with reference to the appended schematic Figures.

DETAILED DESCRIPTION

Figure 2:
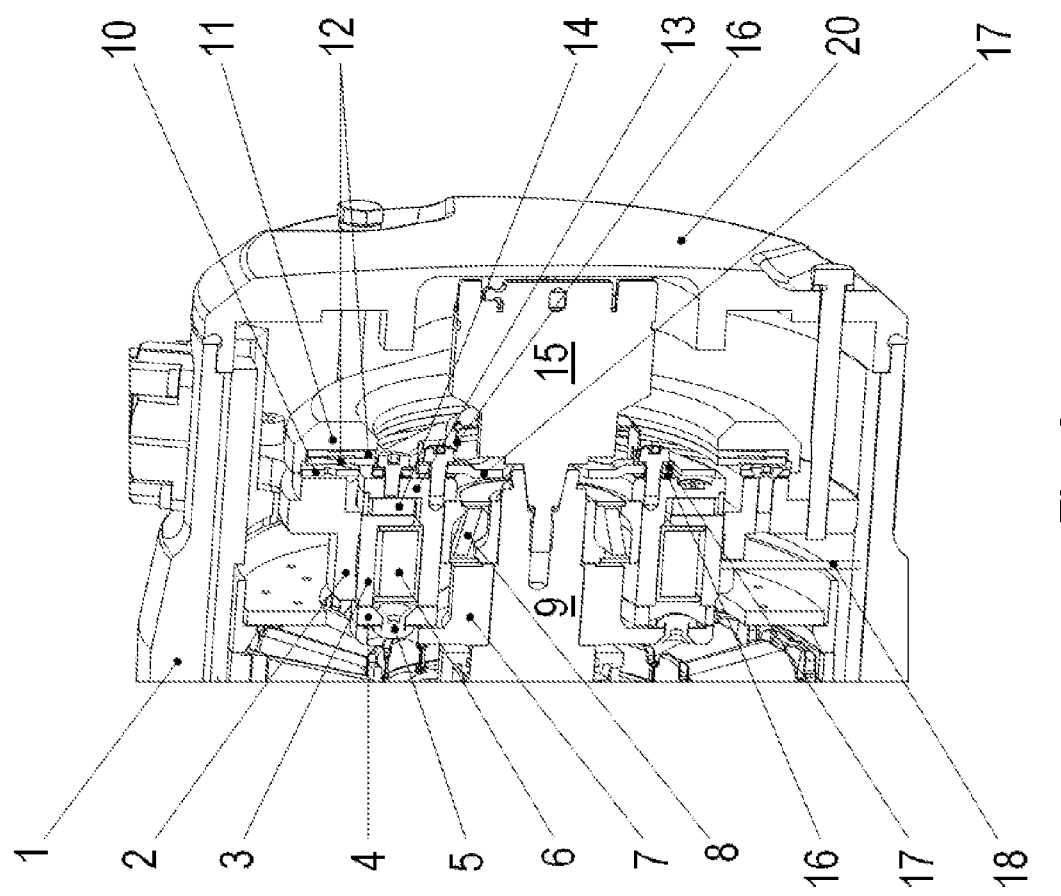
FIG. 2 is a cross-sectional view of a drive, in which a first torque support part 10 of the brake assembly is provided instead of the bellows 40.
Figure 3:
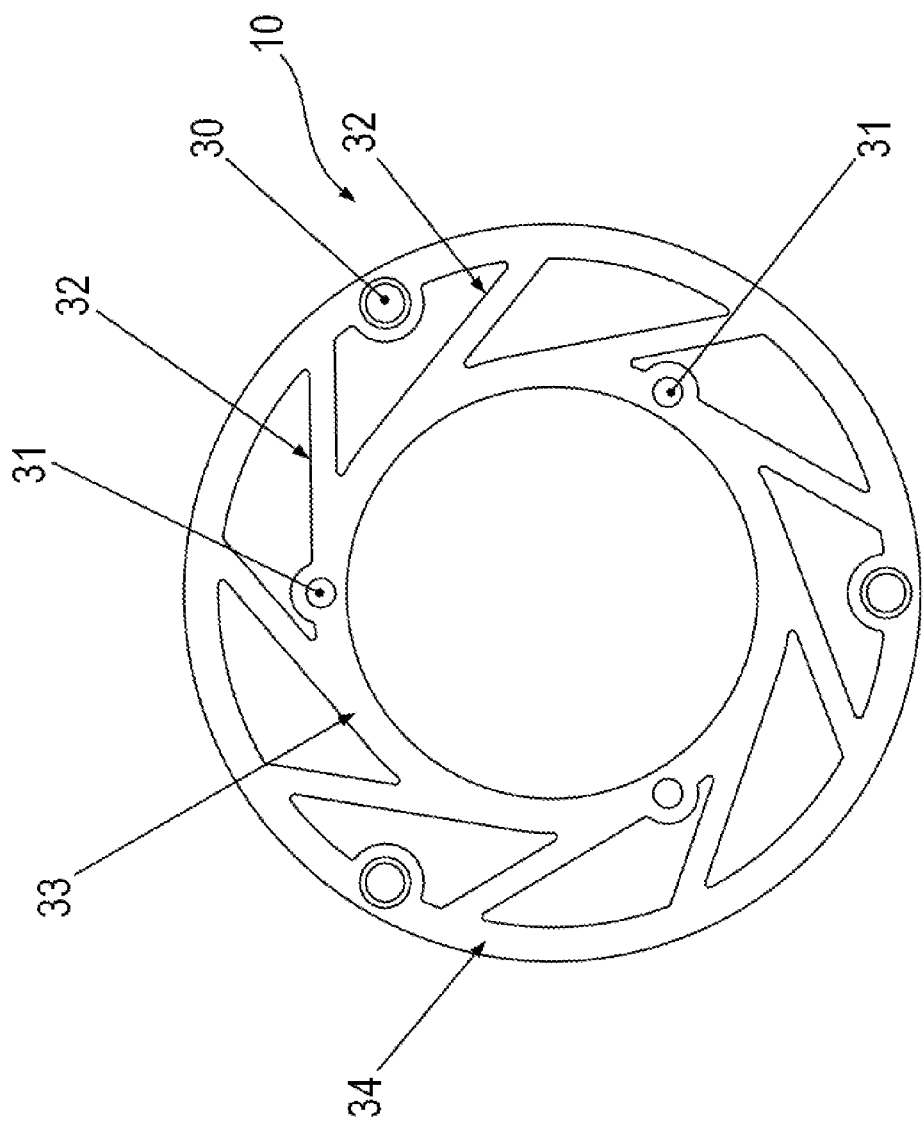
FIG. 3 is a top view of the torque support part

As illustrated in FIG. 2 and FIG. 3, the electric motor includes a rotor 9 that is mounted axially bilaterally by fixed bearings and that at its first axial end region is connected rotation-fast to a rotor shaft of an angle sensor 15.

At its end region facing away from the angle sensor 15, the rotor 9 is connected rotationally-fixed to a sun gear of a planetary gear stage of the gearbox. The sun gear is, e.g., connected to the rotor 9 as a plug-in pinion.

Planetary gears that are rotatably mounted on a planetary carrier and that are engaged with a ring gear connected to the gearbox housing are engaged with the sun gear. The planetary carrier is arranged as output shaft of the planetary gear stage. The gearbox housing is connected to a flange part 22 receiving the bearing 24 of the rotor 9. This bearing 22 is arranged as a fixed bearing. To this end, the flange part 22 has a step against which the outer ring of the bearing 22 is arranged. The inner space of the bearing 22 is positioned against a step arranged on the rotor 9.

The region covered axially by the bearing 24, that is, parallel to the rotational axis of the rotor 9, overlaps with the sun gear arranged as a plug-in pinion and/or the region covered axially by the flange part 22, that is parallel to the rotational axis of the rotor 9, overlaps with the sun gear arranged as a plug-in pinion.

In addition, an insulating part 23 for thermal and electric separation and for receiving the bearing is received in the housing part 1 for functional testing. To this end, an inner groove is added to the housing part 1 and the insulating part 23 is inserted into the inner groove. This insulating part 23 also receives the outer ring of the bearing 24. However, the insulating part 23 does not have a step, so that the bearing 24 is not axially limited by the insulating part 23.

The insulating part 23 is, for example, made of a fiberglass-reinforced plastic and thus has enough stability for carrying out a functional test of the electric motor when the gearbox, and thus also the flange part 22, are not present. However, only idling of the electric motor is possible for the functional testing.

The inner ring of the bearing 24 is seated on a finely machined bearing seat on the rotor 9 and is positioned against the step of the rotor 9. The outer ring of the bearing 24 is inserted into a recess of the insulating part 23 and is not secured axially as long as the outer ring is not received in the flange part 22 and positioned against the step thereof.

Thus, during production merely functional testing is possible while the electric motor is idling, but testing under load is not possible.

Since the bearing 9 is arranged very near the sun gear connected to the rotor 9, thermal expansion of the rotor 9 and/or housing 1 does not cause a significant change in the angle on the sun gear and the planetary gears engaged therewith.

The first bearing 8 of the rotor 9 is also arranged as a fixed bearing. Both the inner ring of the first bearing 8 and the outer ring of the bearing 8 are axially limited. To this end, a step is, for example, formed on the rotor 9, and the inner ring of the first bearing 8 is arranged axially adjacent to a catch 7 that is positioned against a step of the rotor 9.

The outer ring of the first bearing 8 is received in an inner ring 13 of a magnetic body of the brake assembly arranged on the electric motor and is positioned against a step of the inner ring 13 of the magnetic body.

The magnetic body is formed from the inner ring 13 and an outer ring 3. A coil 6 to which current can be applied via electrical supply lines 18 is placed over the inner ring 13 of the magnetic body so that the coil 6 can be energized.

The coil 6 is arranged radially within the outer ring 3 of the magnetic body and radially outside of the inner ring 8 of the magnetic body.

A receiving part 2, e.g., a brake bearing shield, is attached to the housing part 1. The magnetic body, with the coil 6 contained therein, is received in the receiving part 2.

For pretensioning the bearing arrangement formed from the first bearing 8 and the second bearing 9, spring elements 12 supported on a ring 11 connected to the receiving part 2 press the inner ring 13 of the magnetic body towards the outer ring of the first bearing 8 and thus in the direction of the second bearing 24.

Thus, the spring elements 12 prestress the bearing arrangement. That is, if the housing 1 experiences stronger thermally-caused expansion than the rotor 9, the bearing arrangement remains prestressed. Although the rotor 9 is mounted in two fixed bearings, the bearing arrangement is protected from stresses that are too high.

In addition, the functioning of the brake is unaffected.

This is because arranged between the outer ring 3 of the magnetic body and the inner ring 13 of the magnetic body is a permanent magnet 14, the magnetic flux of which is guided through the outer ring 3 to an armature disk 4 and from the armature disk 4 to the inner ring 13 of the magnetic body.

A spring plate arranged axially between the armature disk 4 and the catch 7 is attached to the armature disk 4 with first connecting elements 5, e.g., rivets. The spring plate is attached to the catch 7 with two connecting elements, e.g., rivets. The spring plate resists distancing of the armature disk 4 from the catch 7. This is because as the distance of the armature disk 4 from the catch 7 increases, the spring force pulls the armature disk 4 back, that is, towards the catch 7, with increasing force. The magnetic force of the permanent magnet 14 overcomes the spring force generated by the spring plate, however.

When the coil 6 is not energized, the armature disk 4 is pulled to the magnetic body to reduce the air gap present between the armature disk 4 and the magnetic body, so that the armature disk 4 connected rotationally-fixed to the catch 7 or rotor 9 is pressed towards the magnetic body and thus a braking torque is generated.

When the coil 6 is energized, a counterfield to the magnetic field generated by the permanent magnet is generated, so that less magnetic flux, or no magnetic flux at all, flows via the armature disk 4 and the latter is therefore pulled axially away from the magnetic body by the spring plate.

The armature disk 4 is thus arranged rotationally-fixed with the rotor 9 but axially movable.

A torque support part 10 attached to a receiving part by screws is connected, e.g., by further screws, to the inner ring of the magnetic body. Thus, the reaction torque of the brake assembly is transmitted to the housing.

The torque support part 10 is, for example, arranged axially between the receiving part 2 and the spring elements 12.

The rotor shaft of the angle sensor 15 is connected rotationally-fixed to the rotor 9 and is arranged rotatable relative to the housing of the angle sensor 15 supported on the inner ring 13 of the magnetic body by the second torque support part 16. To this end, the second torque support part 16 is pressed, e.g., to the inner ring 13 of the magnetic body, by a screw, e.g., the screw head thereof, screwed into an axially oriented threaded hole of the inner ring 13 of the magnetic body.

In addition, a further auxiliary sheet 17 having a hexagon socket is attached to the inner ring 13 of the magnetic body as an assembly aid by the screw.

During assembly, the hexagon socket of the auxiliary sheet 17 is first placed in a positive-fit over an external hexagonal-shaped region of the rotor shaft of the angle sensor 15, thus making it possible to screw the rotor shaft of the angle sensor into the rotor 9. It is only after the auxiliary sheet 17 is pressed towards the inner ring 13 of the magnetic body by the screw that this positive-fit hexagonal connection is released due to the axial displacement of the auxiliary sheet 17, and thus the auxiliary sheet 17 if functionless. However, the screw is guided through the auxiliary sheet 17 and the second torque support part 16 and thus the second torque support part 16 is arranged farther removed axially from the housing of the angle sensor 15. In this manner, it is provided very rigid circumferentially, but elastic axially.

As illustrated in FIG. 3, the first torque support part includes an inner ring region 33 arranged radially inside an outer ring region 34, and crosspieces 32 spaced apart from one another circumferentially connect the inner ring region 33 to the outer ring region 34.

Holes 30 passing through the first torque support part 10 and through which a screw screwed into the receiving part 2 projects are arranged on the outer ring region 34.

Holes 31 passing through the first torque support part 10 and through which a screw screwed into the inner ring of the magnetic body projects are arranged on the inner ring 33.

The crosspieces 32 extend increasingly in the circumferential direction as radial distance increases.

Thus, for example, the circumferential angle region covered by the specific crosspiece 32 at a specific radial distance is increasingly displaced radially in the circumferential direction. The width of the crosspiece 32 measured in the circumferential direction is, for example, constant at each radial distance.

Figure 1:
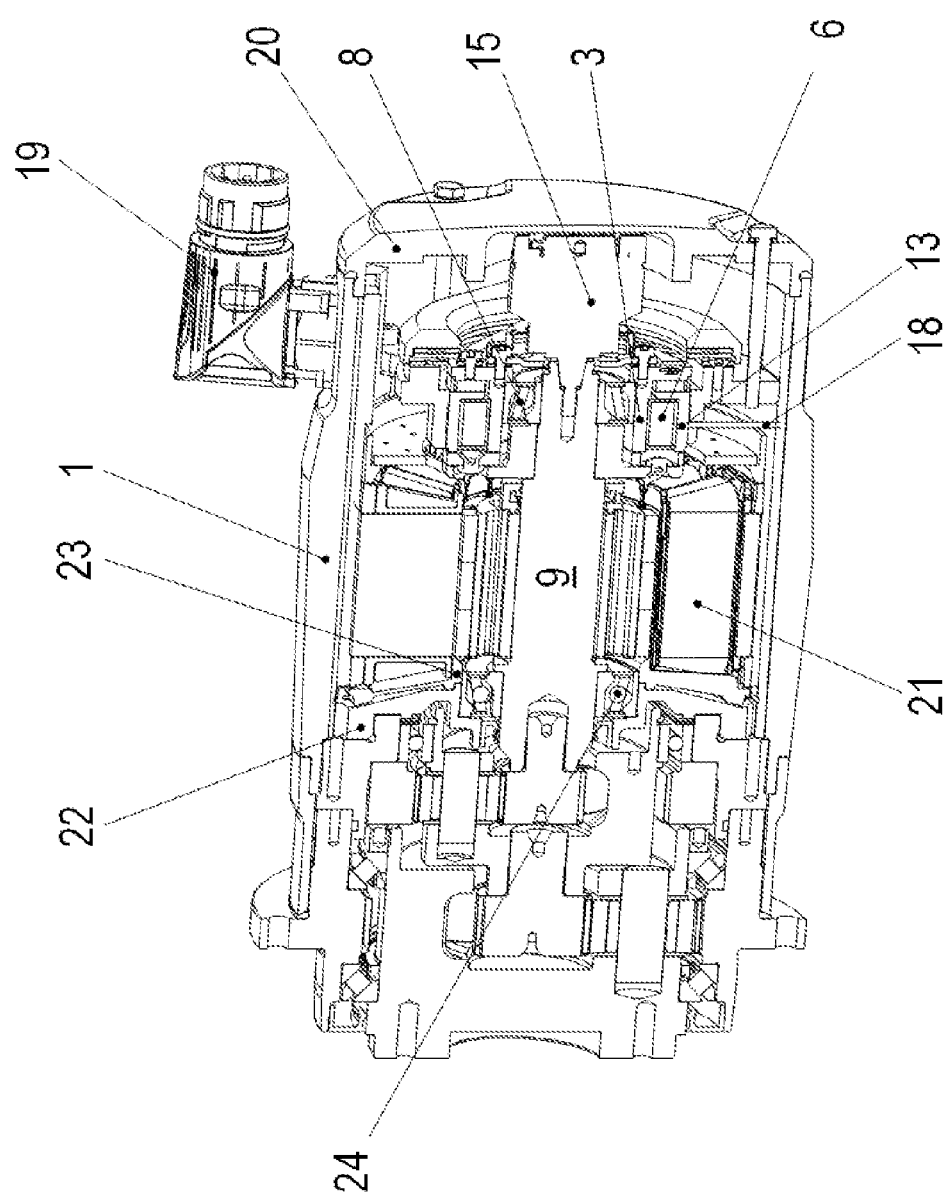
FIG. 1 is a cross-sectional view of a inventive drive having a gearbox driven by a brake motor, in which a bellows 40 arranged as torque support is provided for producing bearing tension of the bearing arrangement of the rotor 9 of the brake motor.
Figure 4:
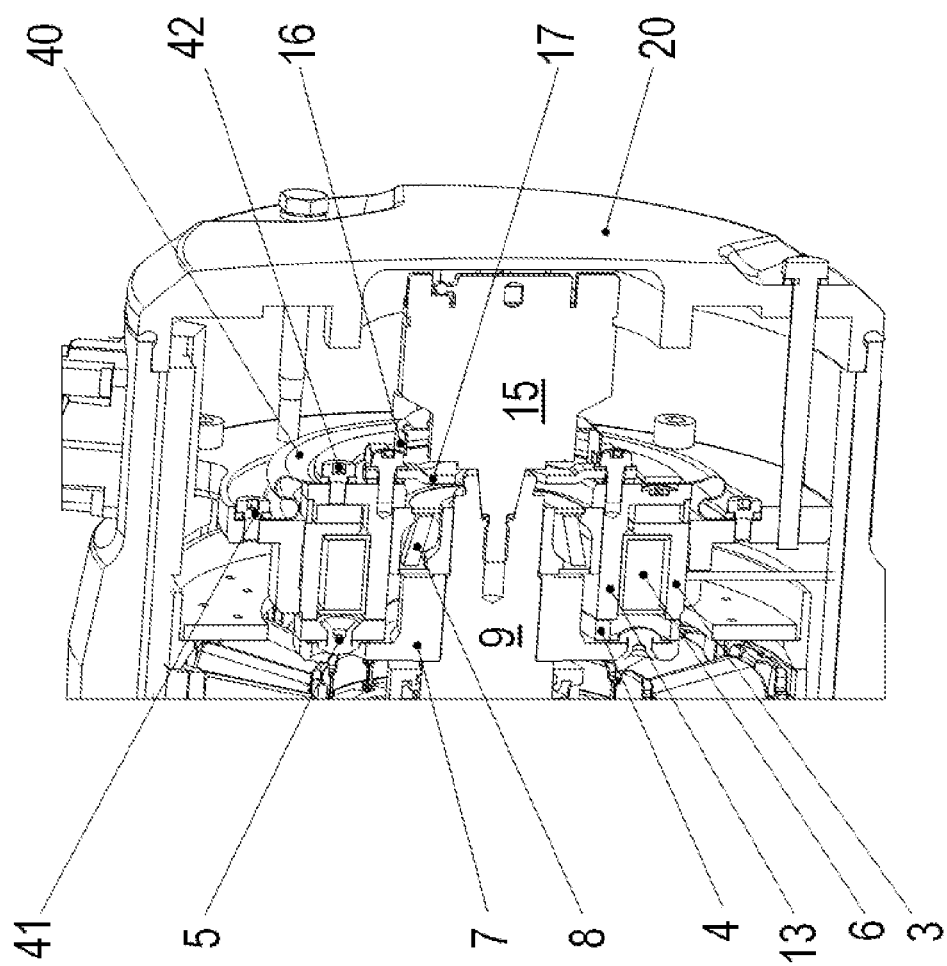
FIG. 4 is an enlarged view of a portion of FIG. 1.

As illustrated in FIG. 1 and FIG. 4, in contrast to the foregoing exemplary embodiment, a bellows 40 is provided that the spring elements 12, the first torque support part 10, and also the ring 11.

The bellows 40 is pressed towards the inner ring 13 of the magnetic body by the second screw 42 and towards the receiving part 2 by the first screw 41. The bellows 40 generates a spring force that acts axially and that generates a spring force oriented from the inner ring 13 of the magnetic body to the second bearing, that is, to the gearbox.

A connecting part 19 is arranged on the housing part 1 for supplying the brake motor, e.g., the stator winding 21.

A housing cover 20 is connected to the housing part 1 and also protects the stator winding 21.

The bellows 40 is, for example, arranged as a metal bellows and at its radially inner end region has a reinforcement, that is, greater wall thickness. During production of the metal bellows 40 from a sheet of constant wall thickness, the region of the reinforcement can be achieved, for example, by folding the sheet and thus creating a double layer. Alternatively, it is also possible to weld on an annular part.

The first bearing 8 and the second bearing 24 are arranged as roller bearings, e.g., as ball bearings.

In further exemplary embodiments, a further spring element or spring arrangement replaces the spring plate.

In further exemplary embodiments, a single spring element or at least one spring packet is employed instead of the spring elements 12. The first connecting elements 5 can also be used for connecting the armature disk 4 to the catch 7.

LIST OF REFERENCE NUMERALS

1 Housing part
2 Receiving part, e.g., brake bearing shield
3 Outer ring
4 Armature disk
5 Connecting element, e.g., rivet
6 Coil
7 Catch
8 First bearing, e.g., ball bearing
9 Rotor of the electric motor
10 First torque support part, e.g., for the brake assembly
11 Ring
12 Spring elements, e.g., spring packet
13 Inner ring
14 Permanent magnet
15 Angle sensor
16 Second torque support part, e.g., for the angle sensor 15
17 Auxiliary sheet with hexagon socket as assembly aid
18 Electrical supply line for coil 6
19 Connecting part
20 Housing cover
21 Stator winding
22 Flange part, e.g., bearing flange
23 Insulating part for thermal and electrical separation and for receiving the bearing for functional testing
24 Second bearing 30 First hole
31 Second hole
32 Crosspiece
33 Inner ring region
34 Outer ring region
40 Bellows, e.g., metal bellows
41 First screw
42 Second screw

The invention claimed is:

1. A drive, comprising:
an electric motor including a rotor, rotatably mounted via a first bearing and a second bearing, and a housing part, the first bearing including an inner ring and an outer ring, the inner ring being arranged on the rotor; and
a brake assembly including a magnetic body, the outer ring being arranged in the magnetic body;
wherein the magnetic body is arranged in a receiving part connected securely to the housing part or is arranged in the housing part, the magnetic body is arranged displaceable axially and is connected to a first torque support part, the first torque support part is connected to the receiving part and/or to the housing part; and
wherein the magnetic body is arranged displaceable axially parallel to a direction of a rotational axis of the rotor, the magnetic body is connected to the first torque support part by second screws and/or by second screws spaced apart from one another regularly in a circumferential direction, and the first torque part is connected to the receiving part and/or to the housing part by first screws and/or first screws spaced apart from one another regularly in the circumferential direction.

2. The drive according to claim 1, wherein the inner ring is arranged against a step and/or pressed against a catch arranged against a step on the rotor, the magnetic body is formed of a ferromagnetic material, and the outer ring is arranged against a step.

3. The drive according to claim 1, wherein the second bearing and/or an outer ring of the second bearing is arranged in the housing part or in a flange part connected to the housing part and/or is arranged against a step, and an inner ring of the second bearing is arranged on the rotor and/or is arranged against a step.

4. The drive according to claim 1, wherein an armature disk, with a catch, is arranged rotationally-fixed and axially displaceable.

5. The drive according to claim 4, wherein a spring element arranged between the catch and the armature disk and/or a spring plate connected to the catch by first connecting elements and/or rivets and connected to the armature disk by second connecting elements and/or rivets is adapted to generate a spring force oriented towards the catch and acting on the armature disk.

6. The drive according to claim 1, wherein the outer ring of the first bearing is positioned against a step arranged on the magnetic body and/or on an inner ring of the magnetic body, and the inner ring of the first bearing is arranged against a step formed on a shaft.

7. The drive according to claim 1, wherein (a) a coil is arranged in the magnetic body and/or arranged in a radial direction between an inner ring of the magnetic body and an outer ring of the magnetic body, and/or (b) a permanent magnet is arranged between the inner ring of the magnetic body and the outer ring of the magnetic body and/or is arranged in an axial direction between the inner ring of the magnetic body and the outer ring of the magnetic body.

8. The drive according to claim 7, wherein when the coil is energized, magnetic flux penetrating an armature disk is reduced and/or reduced in comparison to when the coil is not energized.

9. A drive, comprising:
an electric motor including a rotor, rotatably mounted via a first bearing and a second bearing, and a housing part, the first bearing including an inner ring and an outer ring, the inner ring being arranged on the rotor; and
a brake assembly including a magnetic body, the outer ring being arranged in the magnetic body;
wherein the magnetic body is arranged in a receiving part connected securely to the housing part or is arranged in the housing part, the magnetic body is arranged displaceable axially and is connected to a first torque support part, the first torque support part is connected to the receiving part and/or to the housing part; and
wherein (a) the first torque support part is arranged as a bellows and/or a metal bellows, a region of the first torque support part contacting the receiving part is spaced apart axially from a region contacting the magnetic body and/or a region that is arranged at a smaller radial distance than the region contacting the receiving part, and/or (b) the first torque support part is arranged as a sheet part and/or a sheet metal part such that a region of the first torque support part contacting the receiving part is arranged at a same axial position as a region of the torque support part contacted by the magnetic body and/or that is arranged at a smaller radial distance than the region contacting the receiving part.

10. The drive according to claim 9, wherein the bellows is supported on the receiving part presses an inner ring of the magnetic body and/or a step arranged on the inner ring of the magnetic body toward the outer ring of the first bearing such that the inner ring of the first bearing presses a catch against a step formed on the rotor, and/or a spring element supported on the receiving part, the housing part, or a ring securely connected to the receiving part or the housing part presses an inner ring of the magnetic body and/or a step formed on the inner ring of the magnetic body toward the outer ring of the first bearing such that the inner ring of the first bearing presses the catch against the step formed on the rotor.

11. A drive, comprising:
an electric motor including a rotor, rotatably mounted via a first bearing and a second bearing, and a housing part, the first bearing including an inner ring and an outer ring, the inner ring being arranged on the rotor; and
a brake assembly including a magnetic body, the outer ring being arranged in the magnetic body:
wherein the magnetic body is arranged in a receiving part connected securely to the housing part or is arranged in the housing part, the magnetic body is arranged displaceable axially and is connected to a first torque support part, the first torque support part is connected to the receiving part and/or to the housing part; and
wherein an outer ring of the magnetic body is arranged displaceable axially in the receiving part.

12. A drive, comprising:
an electric motor including a rotor, rotatably mounted via a first bearing and a second bearing, and a housing part, the first bearing including an inner ring and an outer ring, the inner ring being arranged on the rotor; and
a brake assembly including a magnetic body, the outer ring being arranged in the magnetic body:
wherein a rotor shaft of an angle sensor is connected rotationally-fixed to the rotor, and a housing of the angle sensor is connected to a first region of a torque support part, a second region of the torque support part being connected to an inner ring of the magnetic body.

13. The drive according to claim 12, wherein the magnetic body is arranged in a receiving part connected securely to the housing part or is arranged in the housing part, the magnetic body is arranged displaceable axially and is connected to a first torque support part, the first torque support part is connected to the receiving part and/or to the housing part.

14. The drive according to claim 13, wherein the magnetic body is arranged displaceable axially parallel to a direction of a rotational axis of the rotor, the magnetic body is connected to the first torque support part by second screws and/or by second screws spaced apart from one another regularly in a circumferential direction, and the first torque part is connected to the receiving part and/or to the housing part by first screws and/or first screws spaced apart from one another regularly in the circumferential direction.

15. The drive according to claim 12, wherein the second region is arranged at a greater radial distance than the first region and/or the second region is arranged radially further outward than the first region.

16. A drive, comprising:
an electric motor including a rotor, rotatably mounted via a first bearing and a second bearing, and a housing part, the first bearing including an inner ring and an outer ring, the inner ring being arranged on the rotor; and
a brake assembly including a magnetic body, the outer ring being arranged in the magnetic body;
wherein a radial distance region covered by a first torque support part is spaced apart from a radial distance region covered by a second torque support part.

17. A drive, comprising:
an electric motor including a rotor, rotatably mounted via a first bearing and a second bearing, and a housing part, the first bearing including an inner ring and an outer ring, the inner ring being arranged on the rotor; and
a brake assembly including a magnetic body, the outer ring being arranged in the magnetic body;
wherein the magnetic body is arranged in a receiving part connected securely to the housing part or is arranged in the housing part, the magnetic body is arranged displaceable axially and is connected to a first torque support part, the first torque support part is connected to the receiving part and/or to the housing part; and wherein the first torque support part includes an inner ring region, an outer ring region, and crosspieces that connect the inner ring region to the outer ring region and that are spaced apart from one another regularly in a circumferential direction, the inner ring region is arranged against an inner ring of the magnetic body and the outer ring region is arranged against the receiving part or the housing part, and a greatest circumferential angle value of a circumferential angle region covered by a specific crosspiece at a radial distance increases or decreases monotonically as radial distance increases, and a smallest circumferential angle value of the circumferential angle region increases or decreases monotonically as radial distance increases.

18. A drive, comprising:
an electric motor including a rotor, rotatably mounted via a first bearing and a second bearing, and a housing part, the first bearing including an inner ring and an outer ring, the inner ring being arranged on the rotor; and
a brake assembly including a magnetic body, the outer ring being arranged in the magnetic body:
wherein the second bearing and/or an outer ring of the second bearing is arranged in the housing part or in a flange part connected to the housing part and/or is arranged against a step, and an inner ring of the second bearing is arranged on the rotor and/or is arranged against a step; and
wherein an outer ring of the second bearing is arranged in an insulating part and/or an insulating part formed of fiberglass-reinforced plastic that is arranged in the housing part, and the flange part is arranged on a side of the insulating part facing away from the first bearing.

19. The drive according to claim 18, wherein the outer ring of the second bearing is arranged in the insulating part when the flange part and a gearbox have not yet been connected to the housing part, and the insulating part is arranged in a circumferential groove of the housing part.

20. The drive according to claim 19, wherein a first subregion of a region covered axially by an outer ring of the second bearing in an axial direction contacts the flange part and a second subregion of the region covered axially by the outer ring of the second bearing contacts the insulating part, the first subregion being spaced apart from or being adjacent to the second subregion.

21. The drive according to claim 20, wherein the first subregion does not overlap with the second subregion.

* * * * *